(No Model.)
T. ADAMS.
Apparatus for Laying Railway Tracks.
No. 229,229. Patented June 29, 1880.
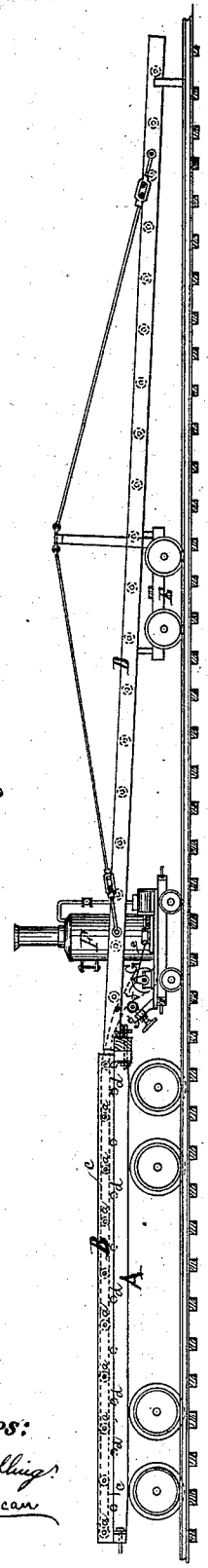
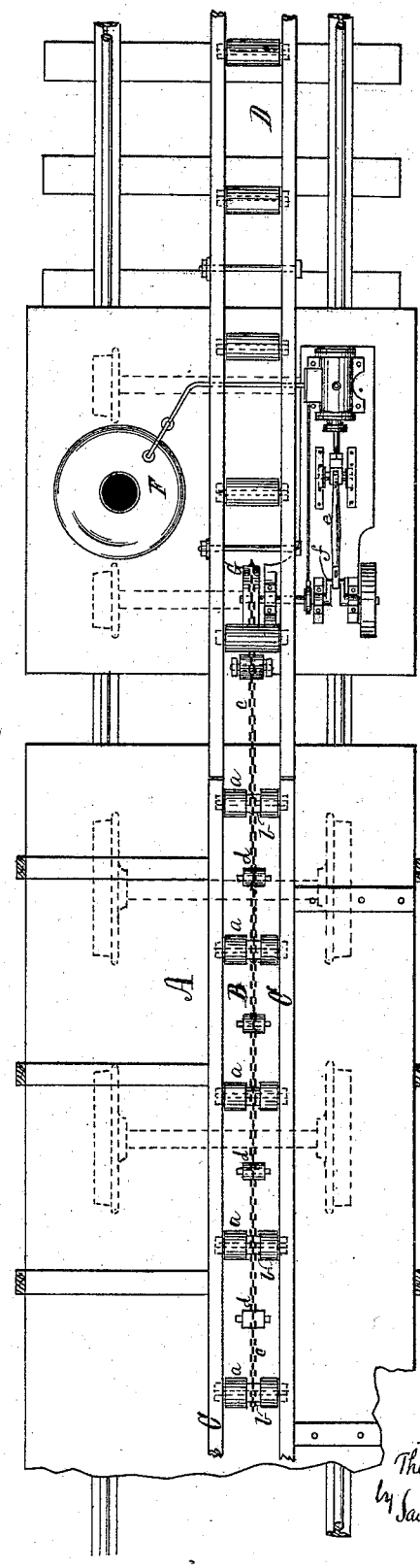
Witnesses:
Henry Eidling
Robt. A. Duncan
Inventor
Theodore Adams
by Saml. A. Duncan
atty.

UNITED STATES PATENT OFFICE.

THEODORE ADAMS, OF PHILADELPHIA, PENNSYLVANIA.

APPARATUS FOR LAYING RAILWAY-TRACKS.

SPECIFICATION forming part of Letters Patent No. 229,229, dated June 29, 1880.

Application filed April 29, 1880. (No model.)

*To all whom it may concern:*

Be it known that I, THEODORE ADAMS, of Philadelphia, in the State of Pennsylvania, have invented a new and useful Improvement in Apparatus for Laying Railway-Tracks, of which the following is a specification.

This invention relates to an improvement on the construction for which I filed an application for Letters Patent on the 2d day of April, 1880, and which consisted in part of a roller-tramway centrally located upon a car, in combination with a chute by which rails, ties, and other materials could be readily unloaded from the car and delivered upon the center of the road-bed.

It is the object of this invention to facilitate the passage of the rails, ties, &c., along the roller-tramway by giving to the rollers of the tramway a positive revolution otherwise than by pushing or drawing the rails and ties over them, so that the revolution of the rollers will carry the rails and ties along the line of the cars and deposit them upon the inclined chute without the application of other power, and this is effected by means of an endless chain or equivalent device passing around and engaging with the rollers and driven by power properly applied.

The invention is illustrated in the accompanying drawings, in which Figure 1 is a side elevation of a platform-car provided with a roller-tramway and endless chain, and also of the engine and chute, and Fig. 2 is a plan view of a portion of the same.

In the drawings, A represents a platform-car, preferably constructed substantially as set forth in said application of April 2, and provided with a convenient space upon one side of the roller-tramway to receive the rails and a space upon its other side for the ties.

B is a roller-tramway provided with rollers *a a*, &c., journaled in the side rails or pieces, C C, and D is a chute mounted upon a truck or small car, E, and connected to the car A, all constructed substantially as fully set forth in the said application. The rollers *a a*, &c., are provided with grooves *b b*, &c., running around their peripheries about midway of their length, and of such depth as to permit the chain to lie below the main surface of the rollers, so as to be out of the way of the rails and ties when on the tramway.

*c* is the endless chain, and may be constructed with links suitable to engage with pins or spurs projecting from the bottoms of the grooves to prevent the slipping of the chain over the surfaces of any of the rollers.

*d d*, &c., are friction-rollers placed on the platform of the car, or set in a channel formed in the platform, as may be desired, and extending along the car, in a line with the grooves in the rollers *a a*, &c. The purpose of these rollers is to reduce the friction of the chain and incidentally to keep it in contact with the under side of the grooved rollers.

F is an engine mounted on trucks arranged to run upon the track-rails, and furnishes the power by which the chain *c* is operated. This is effected by passing the chain around a drum or pulley, G, which is revolved in any convenient way, as by engaging the connecting-rod *e* with the crank-shaft *f*.

*g* is a band-tightener in common form and operated in the usual way.

In case a number of cars are used, each of them is to be provided with a chain or equivalent device extending around its roller-tramway, and when desired the chains can be united to form a single continuous chain extending from the chute to the last car, and embracing and causing the revolution of all the rollers of the entire line. Instead, however, of connecting the chains of the entire train at the start the forward car may be unloaded first, and then the proper connections may be made with the succeeding cars successively as it is desired to unload them.

In case it should be found that sufficient friction may be obtained by the tightener *g*, so that it will be unnecessary to employ a linked chain and projections or pins in the grooves *b b*, &c., to give the required revolution to the rollers, a wire or other rope may be used in the place of the chain.

While I have shown in the drawings substantially the construction described in my application of April 2, the present invention is not limited to the use of the endless chain with a roller-tramway centrally located on the car, but is equally operative and advantageous whenever the tramways are not sufficiently inclined to enable the rails and ties to move along them by the force of gravity.

What is claimed as new is—

1. The combination, in a track-laying apparatus, of the following elements: one or more platform-cars provided with a tramway whose rollers are driven by an endless chain or equivalent device, an engine by which the chain is operated, and an inclined chute, each mounted upon trucks and arranged to move along the track without changing their relative position, substantially as shown and described.

2. In combination with rollers mounted on the platform of a railway-car, and provided with an endless chain or equivalent means for driving them, an inclined way connected with the end of the car for conveying material down to the road-bed, substantially as set forth.

THEODORE ADAMS.

Witnesses:
   ROBERT H. DUNCAN,
   BENJ. A. SMITH.